United States Patent
Huang et al.

(10) Patent No.: US 9,055,062 B1
(45) Date of Patent: Jun. 9, 2015

(54) PER-USER WIRELESS TRAFFIC HANDLING

(71) Applicant: Google Inc., Mountain View, CA (US)

(72) Inventors: Jonathan Huang, Sunnyvale, CA (US); Alain Ayoub, San Jose, CA (US); Trond Thomas Wuellner, Mountain View, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 14/455,873

(22) Filed: Aug. 8, 2014

(51) Int. Cl.
*H04L 29/06* (2006.01)
*H04W 12/06* (2009.01)

(52) U.S. Cl.
CPC ........... *H04L 63/0884* (2013.01); *H04W 12/06* (2013.01); *H04L 63/102* (2013.01)

(58) Field of Classification Search
None
See application file for complete search history.

(56) References Cited

U.S. PATENT DOCUMENTS

| | | | |
|---|---|---|---|
| 7,254,119 B2 * | 8/2007 | Jiang et al. | 370/328 |
| 8,332,914 B2 * | 12/2012 | Buddhikot et al. | 726/4 |
| 8,428,036 B2 | 4/2013 | Herscovici et al. | |
| 8,522,315 B2 * | 8/2013 | Zhang et al. | 726/4 |
| 8,782,741 B1 * | 7/2014 | L'Heureux et al. | 726/3 |
| 2006/0133319 A1 * | 6/2006 | Kant | 370/331 |
| 2010/0125903 A1 | 5/2010 | Devarajan et al. | |
| 2014/0026179 A1 | 1/2014 | Devarajan et al. | |

* cited by examiner

*Primary Examiner* — Minh Dinh
(74) *Attorney, Agent, or Firm* — McDermott Will & Emery LLP

(57) ABSTRACT

A method and system for accessing a wireless local area network are provided. The method and system include receiving, from a wireless client device, an authentication request comprising credentials for a user account of a cloud-based service and forwarding the authentication request to a server associated with the cloud-based service for authentication of the credentials. An authentication response and a configuration profile associated with the user account of the cloud-based service is received from the server. The authentication response is forwarded to the wireless client device. An association request is received from the wireless client device and the wireless client device is associated with the wireless local area network in response to the association request. The association of the wireless client device with the wireless local area network is configured according to the received configuration profile associated with the user account.

20 Claims, 5 Drawing Sheets

PER-USER WIRELESS TRAFFIC HANDLING

BACKGROUND

The present disclosure generally relates to computer networks and, in particular, to managing wireless local area networks.

A wireless local area network (WLAN) allows a client device to access network resources by establishing a wireless connection to the WLAN through an access point (AP). While connected to the WLAN, the client device may access the Internet, access peripheral devices connected to the WLAN and/or communicate with other client devices. However, a WLAN owner may not want all users to have the same level of access to the network resources. A WLAN owner may configure multiple service set identifiers (SSIDs), together with respective passcodes, or configure access profiles for individual client devices to create different levels of access to the network resources. However, the administrative overhead for this hardware based management can be burdensome to the WLAN owner, as different users seek access to the WLAN and/or the WLAN owner modifies access levels previously granted to users. Managing network resources and users is complicated further when multiple users, each with a different level of access, use a common client device to access the WLAN.

SUMMARY

The disclosed subject matter relates to a wireless local network area system. The system includes one or more processors, and a machine-readable medium including instructions stored therein, which when executed by the processors cause the processors to perform operations. The operations include receiving, from a wireless client device, an authentication request comprising credentials for a user account of a cloud-based service. The operation further includes forwarding the authentication request to a server associated with the cloud-based service for authentication of the credentials, and receiving from the server, an authentication response and a user configuration profile associated with the user account of the cloud-based service. Furthermore the operations include forwarding the authentication response to the wireless client device. The operations also include receiving from the wireless client device, an association request that result in associating the wireless client device with the wireless local area network in response to the association request, wherein the association of the wireless client device with the wireless local area network is configured according to the received user configuration profile associated with the user account.

The disclosed subject matter also relates to a machine-readable medium comprising instructions stored therein, which when executed by the processors cause the processors to perform operations. The operations include receiving, from a wireless client device, an authentication request comprising credentials for a user account of a cloud-based service. The operations further include forwarding the authentication request to a server associated with the cloud-based service for authentication of the user credentials and receiving, from the server, an authentication response and a user configuration profile associated with the user account of the cloud-based service, wherein the user configuration profile is configured by an owner of a wireless local area network. The operations further include forwarding the authentication response to the wireless client device. Furthermore the operations includes receiving, from the wireless client device, an association request and subsequently associating the wireless client device with the wireless local area network in response to the association request, wherein the association of the wireless client device with the wireless local area network is configured according to the received user configuration profile associated with the user account.

The disclosed subject matter further relates to a computer-implemented method for accessing a wireless local area network, where the method includes, receiving, from a wireless client device, an authentication request that includes credentials for a user account of a cloud-based service, and forwarding the authentication request to a server associated with the cloud-based service for authentication of the credentials. The method further includes receiving, from the server, an authentication response and a user configuration profile associated with the user account of the cloud-based service, wherein the user configuration profile defines accessibility of resources on the wireless local area network. The method further includes forwarding the authentication response to the wireless client device and subsequently receiving, from the wireless client device, an association request. Furthermore the method includes associating the wireless client device with the wireless local area network in response to the association request, wherein the association of the wireless client device with the wireless local area network is configured according to the received user configuration profile associated with the user account.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

Figure 1:
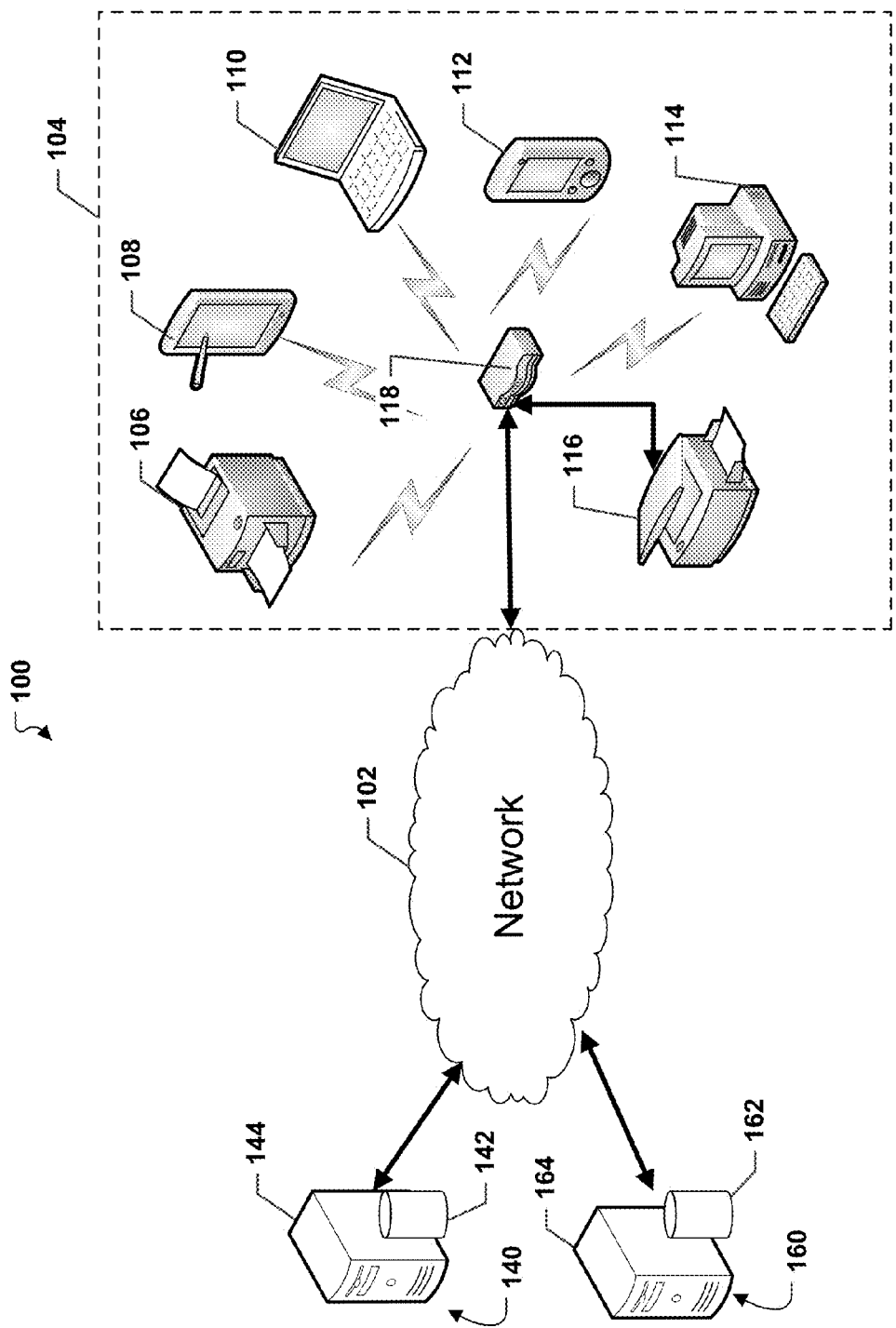
FIG. 1 illustrates an example network environment in which access and use of a wireless local area network is managed based on users' cloud-based credentials.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

As noted above, the administrative overhead for managing network users and resources based on hardware-identification can be burdensome to the WLAN owner as different users seek access to the WLAN and different access levels are granted to users. Managing network resources and users is complicated further when multiple users, each with a different level of access, use a common client device to access the WLAN.

The subject disclosure addresses the issues presented with hardware based management of a WLAN by using cloud-based identities of users, to establish and manage the levels of access granted to the respective users. In this manner, network traffic associated with a particular user will be handled consistently according to a level of access granted by the WLAN owner regardless of the client device being used by the user to access the WLAN. Accordingly, WLAN owners may impose Internet access controls, bandwidth limitations, quality of service rules, peripheral device access rights, etc. on a user level rather than a device level.

In one or more implementations, a wireless access point receives an authentication request from a wireless client device where the authentication request includes credentials for a user account of a cloud-based service. The authentication request is forwarded to a server associated with the cloud-based service and, once authentication is performed by the server, an authentication response is received from the server including a user configuration profile associated with the user account credentials. The authentication response is subsequently forwarded to the wireless client device after which the wireless client device sends an association request back. Upon receiving the association request, the wireless access point associates the wireless client device with the WLAN and configures the association according to the received user configuration profile associated with the user account.

User configuration profiles contain information for managing users' connections to a WLAN and users' use of resources on the WLAN. User configuration profiles may include a content filter configuration for filtering network traffic associated with a wireless client device of a user, a quality of service level relative to configuration profiles associated with other user accounts, access control settings defining accessibility of resources connected to the WLAN for a wireless client device of a user, bandwidth limits for network traffic associated with a wireless client device of a user, etc. The user configuration profiles may be associated with and selected based on user accounts and/or social indicators of relationships between users and WLAN owners. The social indicators may include electronic messaging frequency or common social network grouping between a user and an owner of a WLAN.

In one or more implementations, the wireless access point may receive an authentication request from a second wireless client device where the authentication request includes the credentials for the user account of the cloud-based service included in the authentication request received from the first wireless client device. The authentication request received from the second wireless client device may be forwarded to the server associated with the cloud-based service and, once authentication is performed by the server, an authentication response may be received from the server. The authentication response may be forwarded to the wireless client device after which the wireless client device may send an association request back. Upon receiving the association request, the wireless access point associates the second wireless client device with the WLAN and configures the association according to the received user configuration profile associated with the user account. In this manner, the subject technology allows a user to connect and access resources on a WLAN using any of multiple wireless client devices based on a single configuration profile associated with the user instead of using configurations associated with particular wireless client devices.

FIG. 1 illustrates an example network environment 100 in which access and use of a wireless local area network is managed based on users' credentials for a user account of a cloud-based service. Network environment 100 includes wireless local network area 104, network 102, and servers 140 and 160. Wireless local network area 104 may include computing devices 108-114, peripheral devices 106 and 116, and wireless access point 118. Servers 140 and 160 may include computing devices 144 and 164 and computer-readable storage devices 142 and 162. The network environment 100 includes a wireless access point 118 that directs communication between computing devices (108-114), peripheral devices (106 and 116) and network 102.

In some aspects, network environment 100 can be a distributed client/server system that spans one or more networks such as, for example, network 102. Network 102 can be a large computer network such as, for example, wide area network (WAN), the Internet, a cellular network, or a combination thereof connecting any number of mobile clients, fixed clients, and servers. Further, the network 102 can include, but is not limited to, any of the following network topologies, including a bus network, a star network, a ring network, a mesh network, a star-bus network, tree or hierarchical network, and the like. In some aspects, communication between computing devices (108-114) and servers 140 and 160 can occur via a virtual private network (VPN), Secure Shell (SSH) tunnel, or other secure network connection. In some aspects, network 102 may further include a corporate network (e.g., intranet) and one or more wireless access points.

Wireless local area network 104 can include, but is not limited to, a computer network that covers a limited geographic area (e.g., a home, school, computer laboratory, or office building) using a wireless distribution method (e.g., spread-spectrum or OFDM). Wireless client devices 108 may associate with wireless access point 118 to access wireless local area network 104 using WiFi standards (e.g., IEEE 802.11). Wireless access point 118 may include other network components in addition to a wireless access point. For example, wireless access point 118 may include a router, switch, bridge, broadband modem etc. According to aspects of the subject technology, wireless access point 118 is a wireless router that provides both access point functionality and network routing functionality.

Server 140 may be any system or device having a processor, a memory, and communications capability for providing content and/or services to the client devices 108-114, for example. In some example aspects, the server 140 can include a single computing device 144, for example, or can include more than one computing device working together to perform the actions of a server (e.g., cloud computing, server farm).

Further, the server 140 can represent various forms of servers including, but not limited to, a web server, an application server, a proxy server, etc.

Similarly, server 160 may be any system or device having a processor, a memory, and communications capability for providing content and/or services to the client devices 108-114, for example. In some example aspects, the server 160 can be a single computing device 164, for example, or can include more than one computing device working together to perform the actions of a server (e.g., cloud computing, server farm). Further, the server 160 can represent various forms of servers including, but not limited to, a web server, an application server, a proxy server, etc.

A cloud-based service may include services provided by one or more servers, such as server 140 and server 160, via one or more networks, such as network 102. Cloud-based services may require authentication of user account credentials for access via a cloud-based application, such as a web-based personal portal, a web-based email application, etc.

A cloud-based service may include a social networking service. A social networking service may enable users to create a profile and associate with other users of the social networking service. For example, a user of a social networking service may have different groups of friends, coworkers, and family, and there may be some overlap among those groups (e.g., a coworker who is also considered to be a friend, a family member who is also a coworker). A social networking service may allow users to share content and messages with other users of the social networking service.

Each of computing devices 108-114 may represent various forms of processing devices. By way of example and without limitation, processing devices can include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any of these data processing devices or other data processing devices.

As depicted in FIG. 1, the computing devices 108-114 connect and communicate with the wireless access point 118 using wireless links. These wireless links may be established and managed using various protocols including the IEEE 802.11 protocols. The computing devices 108-114 may communicate wirelessly through a communication interface (not shown), which may include digital signal processing circuitry. In addition to the IEEE 802.11 protocols, the communication interface may provide for communications under other modes or protocols such as, for example, Global System for Mobile communication (GSM) voice calls, Short Message Service (SMS), Enhanced Messaging Service (EMS) or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others.

Peripheral devices 106 and 116 represent devices that provide different functionality to users of the wireless local area network 104. For example, peripheral devices 106 and 116 may be a printer or a multifunction machine that combines printing, scanning and fax functionality, for example. Peripheral devices 106 and 116 may communicate with the wireless access point 118 via a wireless link or may communicate with the wireless access point 118 via a wired connection.

According to aspects of the subject technology, wireless client devices 108-114 may request access to the wireless local area network 104 based on the user's credentials for a cloud-based service provided by server 140, for example. As discussed in more detail below, the user's credentials are included in an authentication request received by the wireless access point 118 from the wireless client devices 108-114. The wireless access point 118 passes the user's credentials to the server 140 for authentication and, if the authentication is successful, receives a configuration profile for the user from the server 140. The wireless access point 118 may then use the received configuration profile to configure a wireless link between the wireless access point 118 and one of the wireless client devices 108-114 that sent the authentication request upon association of the wireless client device with the wireless access point 118.

Figure 2:
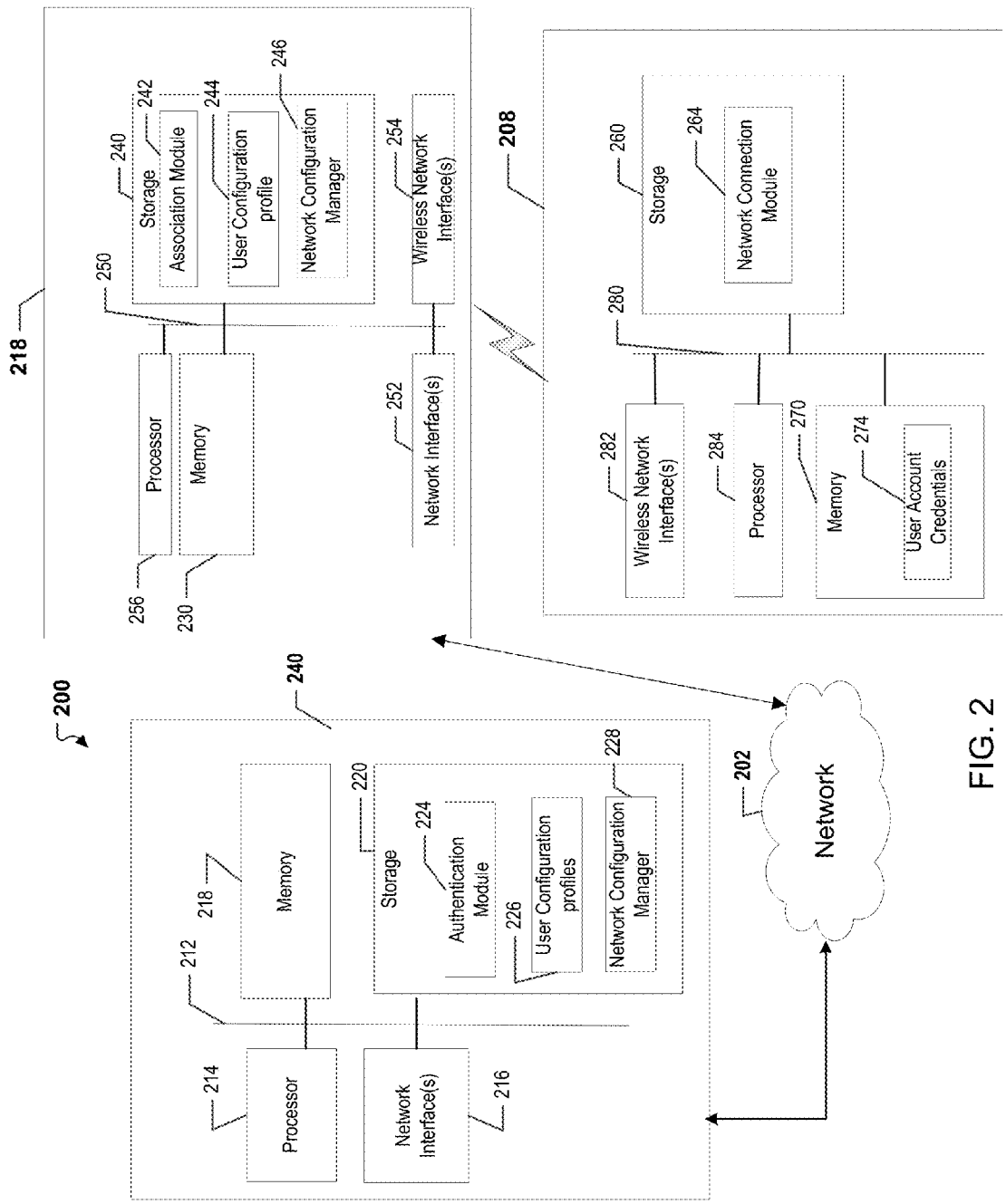
FIG. 2 illustrates an example server, wireless client device and a wireless access point as shown in FIG. 1 according to certain aspects of the disclosure.

FIG. 2 illustrates a server 240, a wireless client device 208, network wireless access point 218 and network 202 similar to the server 140, wireless client 108, wireless access point 118 and network 102 of FIG. 1, respectively, according to aspects of the subject technology. Not all of the components depicted in the figure may be used, however, and one or more implementations may include additional components not shown in the figure. Variations in the arrangement and type of the components may be made without departing from the scope of the subject technology. Additional components, different components, or fewer components may be provided.

Server 240 includes processor 214, memory 218, storage 220, bus 212 and one or more network interfaces 216. Bus 212 collectively represents system, peripheral, and chipset buses that communicatively connect components of server 240. For instance, bus 212 communicatively connects processor 214, memory 218, storage 220 and network interface 216.

Memory 218 may include a dynamic random-access memory (DRAM) and/or a read-only memory (ROM). Memory 218 may provide a temporary location to store data and instructions retrieved and processed by processor 214. Storage 220 may include a non-volatile read-and-write memory that stores data and instructions retrieved and processed by processor 214. For example, storage 220 may include magnetic, solid state and/or optical media.

Processor 214 may retrieve and execute instructions from memory 218 and/or storage 220, in order to perform the processes of the subject disclosure. Processor 214 can be a single processor, a multi-core processor, or multiple processors in different implementations. Authentication module 224 and network configuration manager 228 modules stored in storage 220 may include one or more sets of instructions that, when executed by processor 214, cause processor 214 to perform operations described herein.

Authentication module 224 may be configured to receive and authenticate user credentials for a cloud-based service. Based on the authentication results, authentication module 224 may provide an authentication response to the source of the authentication request, such as the wireless access point 218 and/or wireless client device 208. Upon successful authentication, authentication module 224 may provide the authentication results to network configuration manager 228.

Network configuration manager 228 may be configured to manage user configuration profiles 226 for accessing wireless local area networks. According to certain aspects, network configuration manager 228 may receive a positive authentication response from authentication module 224 and select a user configuration profile from the user configuration profiles 226 stored in storage 220. The user configuration profile may be selected based on the user account credentials authenticated by authentication module 224, social indicators of a relationship between the user associated with the user account credentials and an owner of the wireless local area network to which access is being configured, default configuration settings, etc. Network configuration manager 228 may send the selected user configuration profile to the wireless access point 218 for configuring a wireless link upon association of the wireless client device 208 with the wireless access point 218. The selected user configuration profile may be sent with the authentication response generated by the authentication module 224. The content of the user configuration profiles 226 is discussed in more detail below.

Network configuration manager 228 may further be configured to provide a user interface to facilitate the creation and editing of user configuration profiles and associate user configuration profiles with particular users, based on user account credentials, and particular wireless local area network. For example, the owner of a wireless local area network may log in to the network configuration manager 228 and register the wireless local area network with the network configuration manager 228 under a network identifier, such as an SSID of the wireless local area network. The network owner may then share/grant access to the wireless local area network in a manner similar to that used by cloud-based document collaboration services. For example, the network owner may select another user from their connections in a social networking service and associate that user with the wireless local area network. The network owner also may specify a class of users to associate with the wireless local area network. The class of users may be based on a relationship level within the social networking service, such as being part of a common social group with the social network service or some other social indicator.

In addition to sharing/granting access to the wireless local area network, the network owner may create a new user configuration profile or modify an existing user configuration profile by selecting and/or defining parameters used to configure and control access to the wireless local area network for the user or class of users to which access was granted. The parameters may include bandwidth limits, access control settings, quality of service level, content filter configuration, etc. In this manner, when a particular user or class of users would like to access a network owned and registered by the network owner, the configuration and control of that network access will be consistent for the particular user or class of users regardless of the client device used to access the network.

Wireless access point 218 includes processor 256, memory 230, network interface 252, wireless network interface 254, bus 280 and storage 240. Wireless access point 218 may establish a network connection with wireless client device 208 via wireless network interfaces 254. Bus 280 collectively represents system, peripheral, and chipset buses that communicatively connect the components of wireless access point 218. For instance, bus 280 communicatively connects processor 256, memory 230, storage 240, wireless network interfaces 254 and network interface 252.

Memory 230 may include a dynamic random-access memory (DRAM) and/or a read-only memory (ROM). Memory 230 may provide a temporary location to store data and instructions retrieved and processed by processor 256. Storage 240 may include a non-volatile read-and-write memory that stores data and instructions, even when wireless access point 116 is off, that may be retrieved and processed by processor 256. For example, storage 240 may include magnetic, solid state or optical media.

Processor 256 may retrieve and execute instructions from memory 230 and/or storage 240, in order to perform the processes of the subject disclosure. Processor 256 can be a single processor, a multi-core processor, or multiple processors in different implementations. Association module 242 and network configuration manager 246 stored in storage 240 may include instructions that, when executed by processor 256, cause processor 256 to perform operations described herein.

Association module 242 may be configured to manage the process of associating wireless client devices with wireless access point 218. For example, association module 242 may broadcast availability of the wireless access point 218 in a beacon message and reply to authentication and association requests received from wireless client devices according to connection protocols such as the 802.11 protocols and variations described herein. In replying to authentication requests from wireless client devices, association module 242 may forward the user account credentials received with an authentication request to a server of a cloud-based service, such as server 240, to authenticate the user account credentials. Upon authentication, the association module 242 may receive a user configuration profile 244 associated with the user account credentials and provide the user configuration profile 244 to the network configuration manager 246 to configure the wireless link between the wireless access point 218 and the wireless client device.

Network configuration manager 246 may be configured to configure wireless links and access to resources of the wireless local area network according to a configuration profile associated with user account credentials of a user seeking to access the wireless local area network. The specific configurations may be managed by the network configuration manager 246 or the network configuration manager 246 may send specific parameters to modules and/or computing devices for which the configuration parameters apply.

Wireless client device 208 includes processor 284, one or more wireless network interfaces 282, storage system 260, bus 212 and memory system 270. Bus 212 collectively represents system, peripheral, and chipset buses that communicatively connect the components of wireless client device 208. For instance, bus 212 communicatively connects processor 284, memory 270, storage 260 and network interfaces 282.

Memory 270 may include a dynamic random-access memory (DRAM) and/or a read-only memory (ROM). Memory 270 may provide a temporary location to store data and instructions that may be retrieved and processed by processor 284. Storage 260 may include a non-volatile read-and-write memory that stores data and instructions that may be retrieved and processed by the processor 284.

Processor 284 may retrieve and execute instructions from memory 270 and/or storage 260, in order to perform the processes of the subject disclosure. Processor 284 can be a single processor, a multi-core processor, or multiple processors in different implementations. Network connection module 264 stored in storage 260 may include instructions that, when executed by processor 256, cause processor 256 to perform operations described herein.

Network connection module 264 may be configured to manage the discovery of wireless local area networks and the association process between the wireless client device 208 and the discovered wireless local area networks. Upon discovery of a wireless access point that supports an authentication protocol with a cloud-based service as described herein, the network connection module 264 may send an authentication request including user account credentials 274 of the user using wireless client device 208 to the discovered wireless access point, such as wireless access point 218. While user account credentials are shown as being temporarily stored in memory 270, the user account credentials also may be stored in storage 260. Upon authentication by the server associated with the cloud-based service, such as server 240, the network connection module 264 may be configured to complete the association process with the wireless access point to establish a wireless link configured according to the user configuration profile associated with the user account credentials.

In situations in which the systems and processes discussed here collect or make use of personal information about users, the users may be provided with an opportunity to control whether and/or to what extent the programs or features collect and make use of such user information, or to control whether and/or how to receive content that may be more relevant to the user. In addition, where personal information about the user is stored and/or shared with one or more other users, various privacy controls may be employed to facilitate protecting the storing and/or sharing of such content, such as the user may be provided with an opportunity to limit the visibility of the personal information to one or more other users.

Figure 3:
FIG. 3 illustrates an example of user configuration profiles samples and associated sample contents.

FIG. 3 illustrates examples of four user configuration profiles 304-310 containing configuration parameters for configuring access to a wireless local area network for a wireless client device associated with a wireless access point. As noted above, a network owner may create and/or modify user configuration profiles for particular users, or classes of users, to access the network owner's wireless local area network. User configuration profile 304 represents a profile for a User 1; user configuration profile 306 represents a profile for a User 2; user configuration profile 308 represents a profile assigned to a class of users characterized by one or more social indicators; and user configuration profile 310 represents a default profile for user who may not have a specific profile created for them and do not fall under a specified class of users, but nevertheless are authorized to access the wireless local area network. The number of profiles created/managed for a particular wireless network is not limited. For example, user configuration profiles may be created for any number of particular users, any combination of social indicators (e.g., electronic messaging frequency, common social networking groups, relative positions on social network graphs, etc.), or any other property that may be used to identify or classify a user.

As depicted in FIG. 3, each of the user configuration profiles 304-310 includes four configuration parameters. In the depicted examples, the four configuration parameters include bandwidth limits, access control settings, quality of service level and content filter configuration. These four configuration parameters represent examples of parameters that may be included in a user configuration profile, but are not intended to limit the types or numbers of configuration parameters that may be included in a user configuration profile. In this regard, user configuration profiles may include the four configuration parameters shown in FIG. 3, a subset of the four configuration parameters, additional configuration parameters combined with one or more of the four depicted configuration parameters or in place of the four depicted configuration parameters.

Bandwidth limits represent defined limitations on the bandwidth within a wireless local area network. The bandwidth limits may define a portion of the bandwidth within a wireless access network that is available to a wireless client device being used by a user. The portion may be a percentage of the total bandwidth available (e.g., 25%, 50%), a percentage of the bandwidth determined by the number of other users accessing the wireless local area network, a defined amount of bandwidth (e.g., 10 Mb/s, 25 Mb/s), etc. The bandwidth limits also may restrict a user's access to the wireless local area network to defined periods of time (e.g., between 9 am and 5 pm on weekdays).

Access control settings represent defined access rights to peripherals and other network resources associated with a wireless local area network. For example, access rights may be set for a user to utilize a printer or multi-function device connected to the wireless local area network. Access rights also may be set for a user to access information stored on a network storage device connected to the wireless local area network. The access rights may be limited to certain times of day and/or days of the week. In addition, the access rights may define a priority of access to network resources relative to other users on the wireless local area network.

Quality of service level represents a defined quality of service level that the wireless local area network provides to network traffic associated with a user. The quality of service level may be relative to other users. For example, traffic associated with the network owner may be given priority over all other network traffic and/or traffic associated with a particular user may be given priority over other users or classifications of users. The quality of service may be relative to the type of network traffic. For example, video streaming by a child of the network may not be given priority over network traffic associated with the network owner but may be given priority over non-streaming network traffic or network traffic in general associated with non-family guest users on the wireless local area network.

Content filter configuration represents settings for a content filter for web-related content. The content filter may be implemented with the wireless access point, within a computing device directly connected to the wireless local area network, or on a remote server. The content filter may be configured to limit access to mature subject matter for young users, such as the network owner's children when accessing the internet via the wireless local area network, for example. The content filter also may be configured to limit access to particular web sites for all users on the wireless local area network or a defined group of users on the wireless local area network. Content filters are well known and will not be described in further detail herein.

Figure 4:
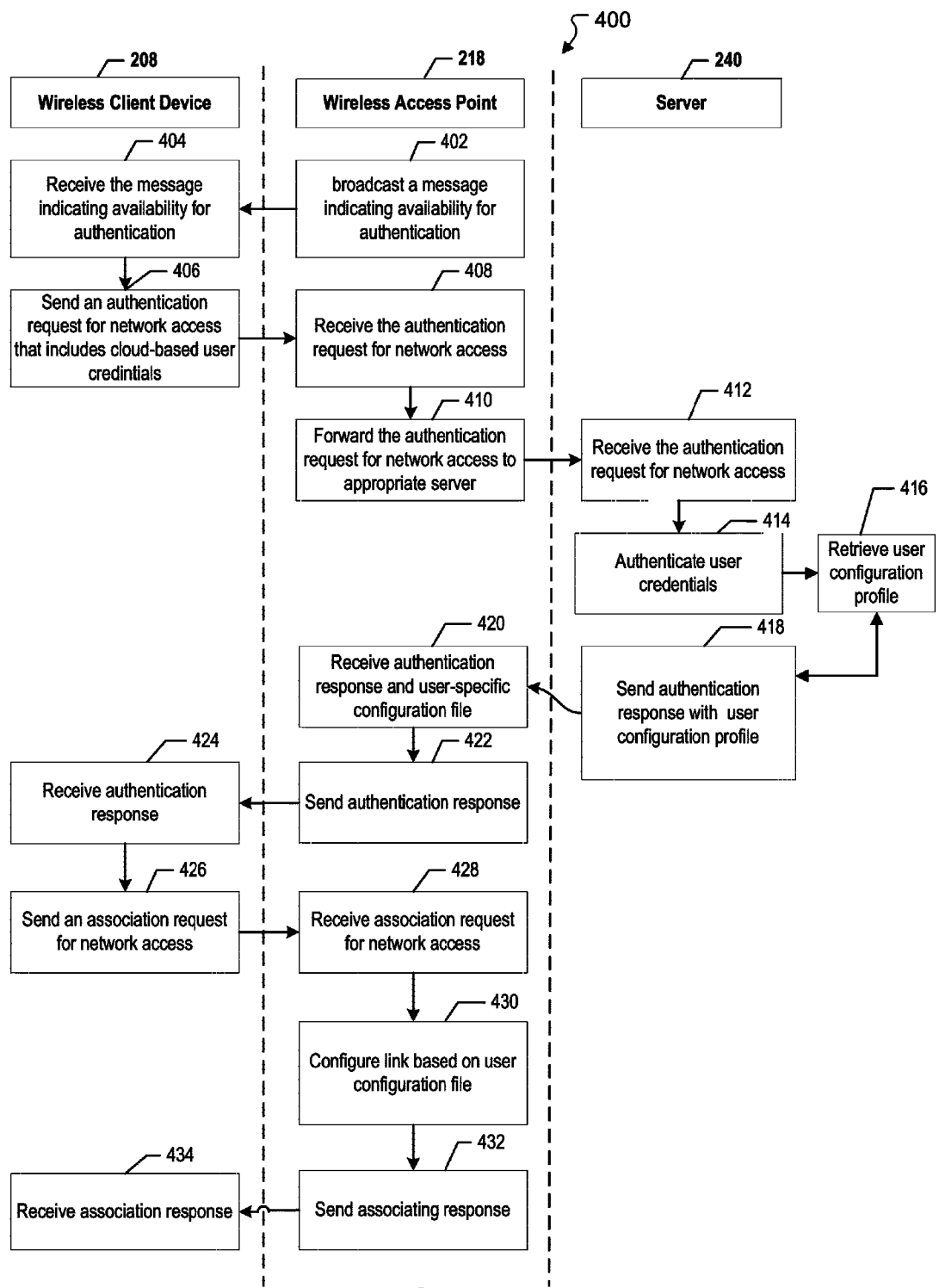
FIG. 4 illustrates an example flow chart of a proposed communication algorithm between the server, wireless client device and a wireless access point in FIG. 1 to access the WLAN and authenticate user based on cloud-based credentials.

FIG. 4 is a flowchart illustrating a process 400 for accessing a wireless local area network according to aspects of the subject technology. For explanatory purposes, the example process 400 is described herein with reference to wireless access point 218, wireless client device 208, and server 240 of FIGS. 1-2; however, the example process 40 is not limited to wireless access point 218, wireless client device 208, and server 140 of FIGS. 1-2, and the example process 400 may be performed by one or more components of wireless access point 218, wireless client device 208, and server 240. Further for explanatory purposes, the blocks of the example process 400 are described herein as occurring in serial, or linearly. However, multiple blocks of the example process 400 may occur in parallel. In addition, the blocks of the example process 400 may be performed a different order than the order shown and/or one or more of the blocks of the example process 400 may not be performed.

In block 402, wireless access point 218 broadcasts a message indicating availability for authentication based on user account credentials for a cloud-based service. The broadcast message may be a beacon announcing the presence of the wireless access point 218 and including information about the wireless local area network associated with the wireless access point 218 such as a network identifier (e.g., SSID) and supported authentication protocols, such as an extensible authentication protocol using a cloud-based service authentication. The beacon may be arranged according to WiFi protocols such as 802.11u to include the information noted above. Alternatively, the message from the wireless access point 218 may be a probe response to a probe request received from wireless client device 208. The wireless client device 208 may use access network query protocol (ANQP) messages and/or messages through a Generic Advertisement Service (GAS) to learn information about wireless access point 218 and determine if wireless access point 218 supports authentication using a cloud-based service.

Upon receiving the message indicating availability for authentication using a cloud-based service and/or determining that availability through pre-authentication message with the wireless access point 218 in block 404, wireless client device 208 sends an authentication request for accessing the wireless local area network to wireless access point 218 in block 406. The authentication request may be configured according to the extensible authentication protocol for the cloud-based service authentication and includes credentials for a user account of the cloud-based service. The credentials may be temporarily stored on the wireless client device 208 when the user logs in to the wireless client device 208 or to an application associated with the cloud-based service. This temporary storage may be contingent on the user authorizing the storage and use of the credentials in the settings of the wireless client device 208 or the application associated with the cloud-based service. Wireless client device 208 may need to validate a digital certificate (e.g., SSL certificate, X.509 certificate) associated with the cloud-based service to transmit the authentication request securely.

The wireless access point 218 receives the authentication request including the user account credentials from the wireless client device 208 in block 408 and forwards the authentication request with the user account credentials to server 240 for authentication in block 410. The wireless access point 218 may recognize the authentication request received from the wireless client device 208 as being for the cloud-based service provided by server 140 based on the extensible authentication protocol used by the wireless client device 208 to configure and send the authentication request. Extensible authentication protocols for authentication services outside of wireless access points are generally known and will not be described in further detail herein. The wireless access point 218 may transport the authentication request via a secure SSL tunnel, for example, preventing the actual account credentials from being exposed to the wireless local area network.

The server 240 receives the authentication request from the wireless access point 218 in block 412 and authenticates the account credentials included with the authentication request in block 414. If the user account credentials are current and valid with the cloud-based service, the server 240 retrieves a user configuration profile associated with account credentials in block 416. In retrieving the user configuration profile, the server 240 may first determine if the wireless local area network associated with the wireless access point 218 from which the authentication request was received is registered in the network configuration manager. If the wireless local area network is registered in the network configuration manager, the user configuration profiles managed on the server are searched for a user configuration profile associated with both the account credentials and the wireless local area network. As noted above, the user configuration profiles may be associated directly with user account credentials, may be associated with user account credentials based on social indicators of the relationship between the network owner and the user of the user account credentials, or may be associated with the user account credentials by default for the particular wireless local area network.

Upon successful authentication of the user account credentials and location of an associated user configuration profile, the server 240 sends an authentication response and the retrieved user configuration profile to the wireless access point 218 in block 420. The wireless access point 218 sends the positive authentication response to the wireless client device 208 in block 422 and retains the user configuration profile for future configuration if the wireless client device 208 completes association with the wireless access point 218 to access the wireless local area network. The user configuration profile is associated with an identifier corresponding to the user account credentials in the wireless access point 218. The association may be done using the user account credentials, a portion of the user account credentials such as a user name but not a passcode, or some other identifier unique to the user account.

The wireless client device 208 receives the authentication response from the wireless access point 218 in block 424. In response to a positive authentication, the wireless client device 208 sends an association request to the wireless access point 218 in block 426 to complete the association with the wireless access point 218 and gain access to the wireless local area network and the connected network resources in accordance with the user configuration profile associated with the user account credentials used for authentication.

The wireless access point 218 receives the association request for network access from the wireless client device 208 in block 428 and completes the process to associate the wireless client device 208 with the wireless access point 218 using the IEEE 802.11 association protocols, for example, to establish a wireless link with the wireless client device 208. In block 430, the wireless access point 218 retrieves the user configuration profile associated with the user account credentials of the user of the wireless client device 208 and configures the access to the wireless local area network and any connected network resources according the parameters in the profile. The wireless access point 218 then sends a positive association response back to the wireless client device 208 in block 432 and the wireless client device 208 receives the association response in block 434 to confirm the association with the wireless local area network and the ability of the wireless client device 208 to now access the wireless local area network.

In the processes and systems described above, access to a wireless local area network and the network resources associated with that network are managed and controlled based on user credentials of a user of a wireless client device rather than a hardware identifier of the wireless client device itself. The use of a user configuration profile to configure and manage the network access afforded to a particular user rather than a particular device provides eases the burden and provides flexibility to network owners to manage access to their networks based on who is using the network regarding of the device used to access the network.

Figure 5:
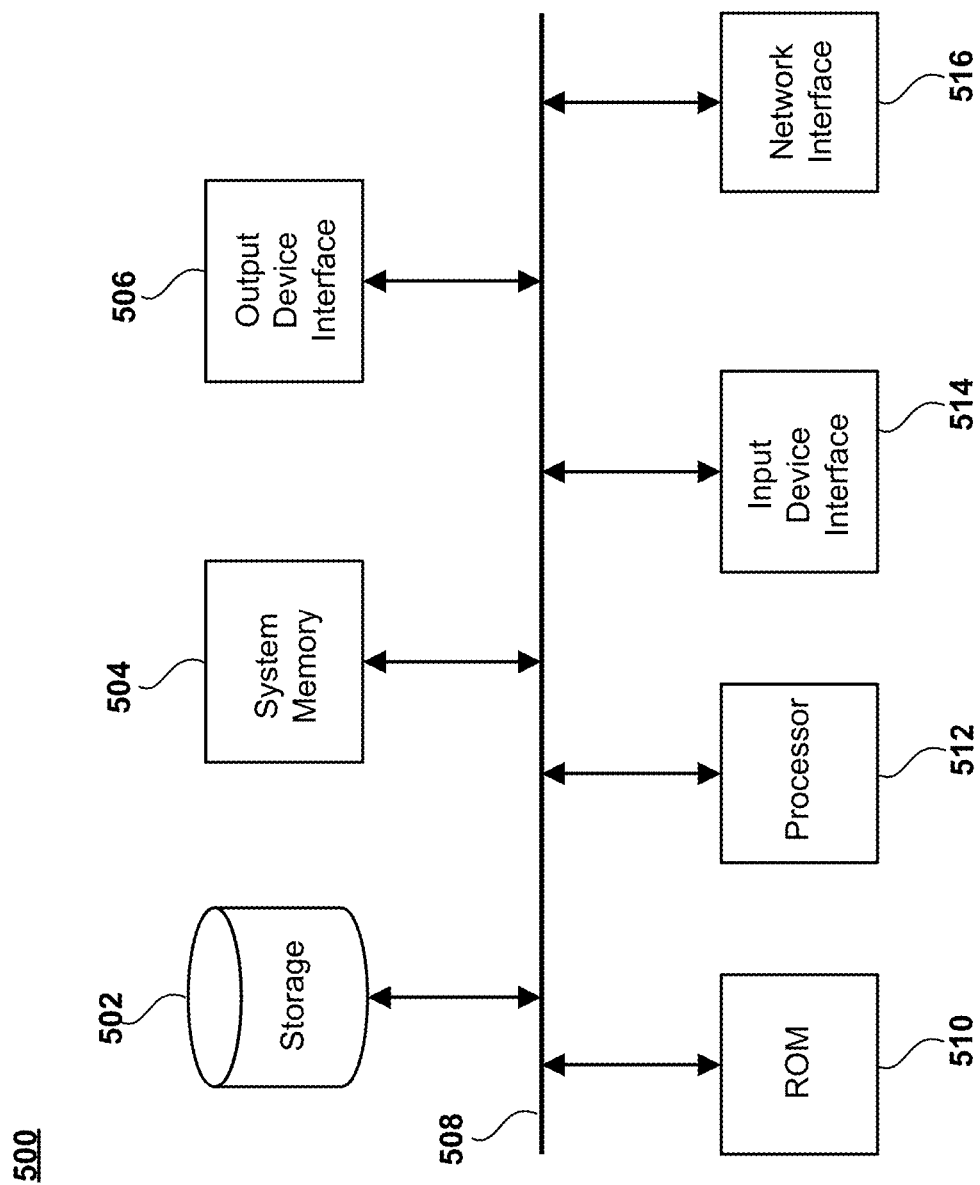
FIG. 5 conceptually illustrates an electronic system with which some implementations of the subject technology are implemented.

FIG. 5 conceptually illustrates a computing system 500 with which implementations of the subject technology, such as server 140/240 and wireless client device 108/208, may be implemented. Electronic system 500 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 500 includes a bus 508, processor 512, a system memory 504, a read-only memory (ROM) 510, a permanent storage device 502, an input device interface 514, an output device interface 506, and a network interface 516.

Bus 508 collectively represents system, peripheral, and chipset buses that communicatively connect the numerous internal devices of electronic system 500. For instance, bus 608 communicatively connects processor 512 with ROM 510, system memory 504, and permanent storage device 502.

From these various memory units, processor 512 retrieves instructions to execute and data to process in order to execute the processes of the subject disclosure. The processor can be a single processor or a multi-core processor in different implementations.

ROM 510 stores static data and instructions that are needed by processor 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. For example, the various memory units include instructions for network access and resources management according to various implementations. From these various memory units, processor 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a wireless client device in response to requests received from the web browser.

Implementations of the subject matter described in this specification can be implemented in a server that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The server system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that some illustrated steps may not be performed. Some of the steps may be performed simultaneously. For example, in certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. An access system for a wireless local area network, the access system comprising:
   one or more processors; and
   a machine-readable medium comprising instructions stored therein, which, when executed by the one or more processors cause the one or more processors to perform operations comprising:
   receiving, from a wireless client device, an authentication request comprising credentials for a user account of a cloud-based service;
   forwarding the authentication request to a server associated with the cloud-based service for authentication of the credentials;
   receiving, from the server, an authentication response and a configuration profile associated with the user account of the cloud-based service;
   forwarding the authentication response to the wireless client device;
   receiving, from the wireless client device, an association request; and
   associating the wireless client device with the wireless local area network in response to the association request, wherein the association of the wireless client device with the wireless local area network is configured according to the received configuration profile associated with the user account.

2. The access system of claim 1, wherein the configuration profile comprises a content filter configuration for filtering network traffic associated with the wireless client device.

3. The access system of claim 1, wherein the configuration profile comprises a quality of service level, wherein the quality of service level is relative to configuration profiles associated with other user accounts of the cloud-based service.

4. The access system of claim 1, wherein the configuration profile comprises access control settings defining accessibility of resources connected to the wireless local area network for the wireless client device.

5. The access system of claim 1, wherein the configuration profile comprises bandwidth limits for network traffic associated with the wireless client device.

6. The access system of claim 1, wherein the operations further comprise:
   receiving, from a second wireless client device, an authentication request comprising the credentials for the user account of the cloud-based service;
   forwarding the authentication request to the server associated with the cloud based service for authentication of the credentials;
   receiving, from the server, an authentication response;
   forwarding the authentication response to the second wireless client device;
   receiving, from the second wireless client device, an association request; and
   associating the second wireless client device with the wireless local area network in response to the association request, wherein the association of the second wireless client device with the wireless local area network is configured according to the received configuration profile associated with the user account.

7. The access system of claim 1, wherein the configuration profile associated with the user account of the cloud-based service is based on one or more social indicators of the relationship between the user account and another user account associated with an owner of the wireless local area network.

8. The access system of claim 7, wherein the social indicators comprise at least one of electronic messaging frequency or common social network grouping.

9. A non-transitory machine-readable medium comprising instructions stored therein, which, when executed by one or more processors cause the one or more processors to perform operations comprising:
- receiving, from a wireless client device, an authentication request comprising credentials for a user account of a cloud-based service;
- forwarding the authentication request to a server associated with the cloud-based service for authentication of the credentials;
- receiving, from the server, an authentication response and a configuration profile associated with the user account of the cloud-based service, wherein the configuration profile is configured by an owner of a wireless local area network;
- forwarding the authentication response to the wireless client device;
- receiving, from the wireless client device, an association request; and
- associating the wireless client device with the wireless local area network in response to the association request, wherein the association of the wireless client device with the wireless local area network is configured according to the received configuration profile associated with the user account.

10. The non-transitory machine-readable medium of claim 9, wherein the configuration profile comprises a content filter configuration for filtering network traffic associated with the wireless content device.

11. The non-transitory machine-readable medium of claim 9, wherein the configuration profile comprises a quality of service level, wherein the quality of service level is relative to configuration profiles associated with other user accounts of the cloud-based service.

12. The non-transitory machine-readable medium of claim 9, wherein the configuration profile comprises access control settings defining accessibility of resources connected to the wireless local area network for the wireless client device.

13. The non-transitory machine-readable medium of claim 9, wherein the configuration profile comprises bandwidth limits for network traffic associated with the wireless client device.

14. The non-transitory machine-readable medium of claim 9, wherein the configuration profile associated with the user account of the cloud-based service is based on one or more social indicators of the relationship between the user account and another user account associated with the owner of the wireless local area network.

15. A computer-implemented method for accessing a wireless local area network, the method comprising:
- receiving, from a wireless client device, an authentication request comprising credentials for a user account of a cloud-based service;
- forwarding the authentication request to a server associated with the cloud-based service for authentication of the credentials;
- receiving, from the server, an authentication response and a configuration profile associated with the user account of the cloud-based service, wherein the configuration profile defines accessibility of resources on the wireless local area network;
- forwarding the authentication response to the wireless client device;
- receiving, from the wireless client device, an association request; and
- associating the wireless client device with the wireless local area network in response to the association request, wherein the association of the wireless client device with the wireless local area network is configured according to the received configuration profile associated with the user account.

16. The computer-implemented method of claim 15, wherein the configuration profile comprises a content filter configuration for filtering network traffic associated with the wireless content device.

17. The computer-implemented method of claim 15, wherein the configuration profile comprises a quality of service level, wherein the quality of service level is relative to configuration profiles associated with other user accounts of the cloud-based service.

18. The computer-implemented method of claim 15, wherein the configuration profile comprises bandwidth limits for network traffic associated with the wireless client device.

19. The computer-implemented method claim 15, wherein the operations further comprise:
- receiving, from a second wireless client device, an authentication request comprising the credentials for the user account of the cloud-based service;
- forwarding the authentication request to the server associated with the cloud-based service for authentication of the credentials;
- receiving, from the server, an authentication response;
- forwarding the authentication response to the second wireless client device;
- receiving, from the second wireless client device, an association request; and
- associating the second wireless client device with the wireless local area network in response to the association request, wherein the association of the second wireless client device with the wireless local area network is configured according to the received configuration profile associated with the user account.

20. The computer-implemented method of claim 15, wherein the configuration profile associated with the user account of the cloud-based service is based on one or more social indicators of the relationship between the user account and another user account associated with an owner of the wireless local area network.

* * * * *